United States Patent
Imanishi et al.

(10) Patent No.: US 6,857,984 B2
(45) Date of Patent: Feb. 22, 2005

(54) STARTER HAVING THRUST RECEIVING MEMBER BETWEEN MOTOR SHAFT AND OUTPUT SHAFT

(75) Inventors: Tomoya Imanishi, Kariya (JP); Sadayoshi Kajino, Nagoya (JP); Yasuo Osawa, Nitta-gun (JP)

(73) Assignees: Denso Corporation, Kariya (JP); Sawafuji Electric Co., Ltd., Tokyo (JP)

( * ) Notice: Subject to any disclaimer, the term of this patent is extended or adjusted under 35 U.S.C. 154(b) by 0 days.

(21) Appl. No.: 10/166,012

(22) Filed: Jun. 11, 2002

(65) Prior Publication Data

US 2003/0109354 A1 Jun. 12, 2003

(30) Foreign Application Priority Data

Oct. 31, 2001 (JP) ........................................ 2001-335013

(51) Int. Cl.[7] .............................................. F16H 48/06
(52) U.S. Cl. ........................... 475/331; 475/149; 74/7 E
(58) Field of Search ................................ 475/331, 149; 74/6, 7 E, 331

(56) References Cited

U.S. PATENT DOCUMENTS

| 4,848,172 A | * | 7/1989 | Morishita | 74/7 E |
| 4,891,996 A | * | 1/1990 | Isozumi et al. | 74/6 |
| 4,951,515 A | * | 8/1990 | Morishita et al. | 74/7 E |
| 5,557,976 A | | 9/1996 | Moribayashi et al. | |
| 5,649,879 A | * | 7/1997 | Kusumoto et al. | 475/331 |
| 5,857,380 A | * | 1/1999 | Kajino et al. | 74/7 E |
| 6,076,413 A | * | 6/2000 | Verot et al. | 74/7 E |
| 6,490,940 B1 | * | 12/2002 | Izquierdo et al. | 74/7 E |

FOREIGN PATENT DOCUMENTS

EP  562475  * 9/1993 ................. 74/7 E

* cited by examiner

*Primary Examiner*—Ha Ho
(74) *Attorney, Agent, or Firm*—Oliff & Berridge, PLC

(57) ABSTRACT

In a starter, an output shaft is disposed on a same axial line with a motor shaft through a planetary gear reduction device. The output shaft has an accommodation recess at the rear end thereof and rotatably receives the top end of the motor shaft therein through a ball. The output shaft and the motor shaft have respective end surfaces opposing each other in the axial direction with a spacing therebetween under a condition that the ball is disposed between the output shaft and the motor shaft. A thrust receiving member thinner than the spacing is disposed in the spacing. The thrust receiving member limits a movement of the output shaft toward the motor due to wear of the accommodation recess.

18 Claims, 3 Drawing Sheets

STARTER HAVING THRUST RECEIVING MEMBER BETWEEN MOTOR SHAFT AND OUTPUT SHAFT

CROSS REFERENCE TO RELATED APPLICATION

This application is based on and incorporates herein by reference Japanese Patent Application No. 2001-335013 filed Oct. 31, 2001.

FIELD OF THE INVENTION

The present invention relates to a reduction type starter having a planetary gear reduction device, which transmits rotation of a motor to an output shaft in a reduced rotation speed.

BACKGROUND OF THE INVENTION

A reduction-type starter is disclosed in U.S. Pat. No. 5,557,976 (JP-A-7-293404). This starter has a planetary gear reduction device, which transmits rotation of a motor to an output shaft while reducing the rotation speed. A motor rotation shaft and the output shaft are arranged coaxially to each other through the reduction device.

The output shaft is formed with an accommodation recess around its radial center on the rear end facing the motor shaft. The top end of the motor shaft is inserted into the accommodation recess through a bearing. A ball is held between the top end surface of the motor shaft and the axial end surface (bottom surface) of the accommodating recess, thereby to receive thrust load.

In this starter, the output shaft has a flange with an increased diameter at its rear end. The flange is formed with pin holes into which pins are press-fit to fix planetary gears of the reduction device. The output shaft cannot be heat-treated, because press-fitting the pins into the pin holes are likely to cause cracks around the pin holes if the flange has been heat-treated. Therefore, the output shaft is normally not subjected to heat treatment but instead subjected to induction hardening only with respect to parts, which need hardening.

However, the output shaft is not so hardened at the inside of the accommodation recess. As a result, the wall of the accommodation recess contacting the ball gradually wears as the number of operations of the starter increases. The increase in the wear tends to move the output shaft to the motor side. As such the pins supporting the planetary gears interfere with a partition wall disposed between the motor and the reduction device, thus influencing the motor rotation. In addition, the increase in the wear instabilize rolling or movement of the ball. As such it becomes difficult to align the radial centers of the motor shaft and the output shaft which are coupled through the ball. Misalignment of the radial centers of the motor shaft and the output shaft produces unbalanced or uneven load on the planetary gear reduction device, thus causing loss in rotation and lowering of starter performance.

SUMMARY OF THE INVENTION

It is therefore an object of the present invention to provide a starter, which is less affected by wear of an output shaft coupled with a motor rotation shaft through a ball.

According to the present invention, a starter has a motor shaft and an output shaft disposed on a same axial line through a planetary gear reduction device. The output shaft has an accommodation recess at the rear end thereof and rotatably receives the top end of the motor shaft therein through a ball. The output shaft and the motor shaft have respective end surfaces opposing each other in the axial direction with a spacing therebetween under a condition that the ball is disposed between the output shaft and the motor shaft. A thrust receiving member thinner than the spacing is disposed in the spacing. The thrust receiving member limits a movement of the output shaft toward the motor due to wear of the accommodation recess.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
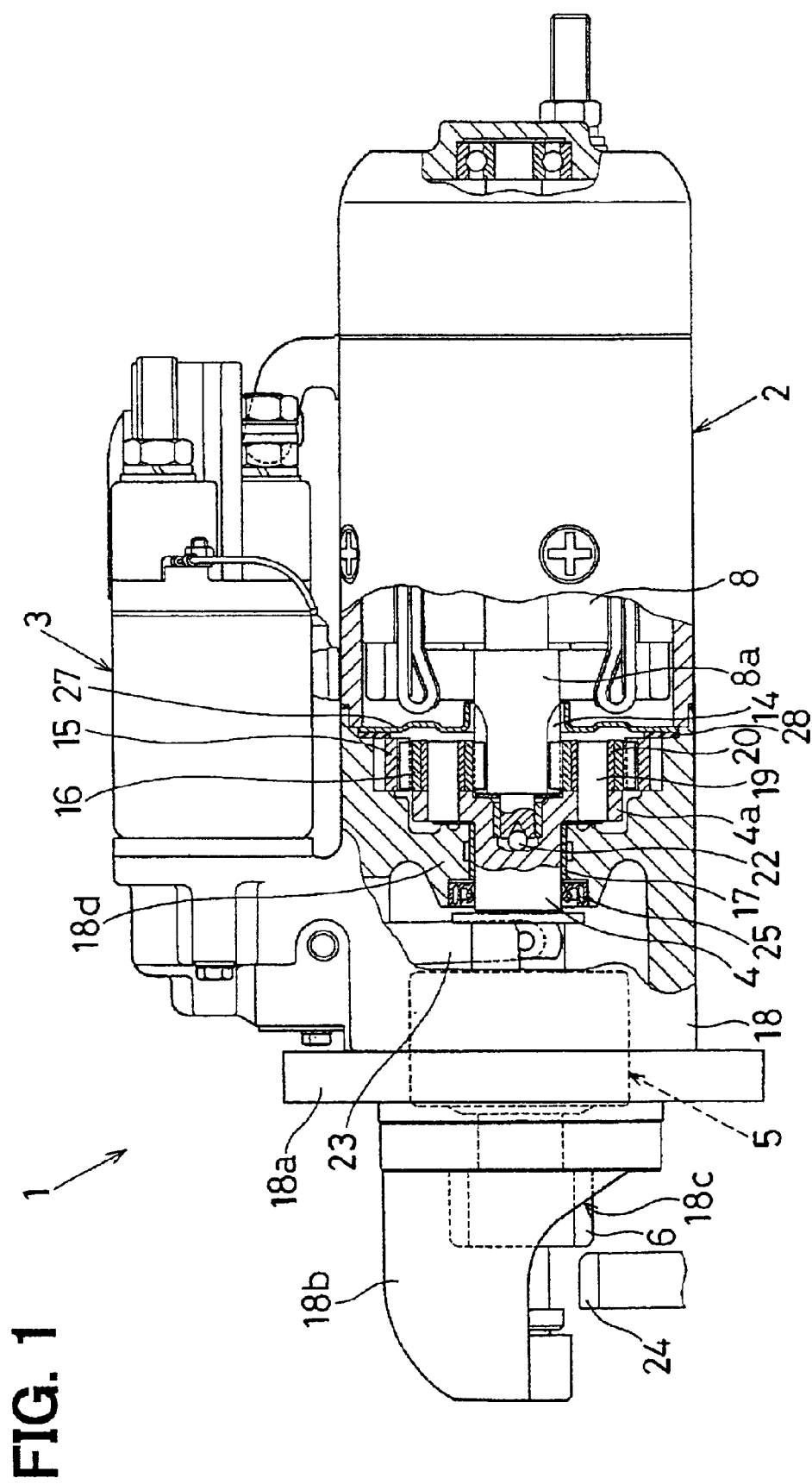
FIG. 1 is a side view showing, partly in section, a starter according to one embodiment of the present invention.

Referring first to FIG. 1, a starter 1 is constructed with an electric motor 2, an electromagnetic switch device 3, a reduction unit, an output shaft 4, a one-way clutch 5, a pinion gear 6 and the like. The motor 2 generates rotary force. The electromagnetic switch device 3 controls turning-on/off of a motor current supplied to the motor 2. The reduction unit transmits rotation of the motor 2 to the output shaft 4 in reduced speed. The one-way clutch 5 is mounted on the output shaft 4, and transmits the rotation of the output shaft 4 to the pinion gear 6 therethrough. The reduction unit, output shaft 4, one-way clutch 5 and pinion gear 6 are housed in a generally cylindrical housing 18, which are fixedly coupled with a cylindrical yoke of the motor 2. A partition wall 27 and a rubber cushion 28 are disposed between the yoke of the motor 2 and the reduction unit.

Figure 3:
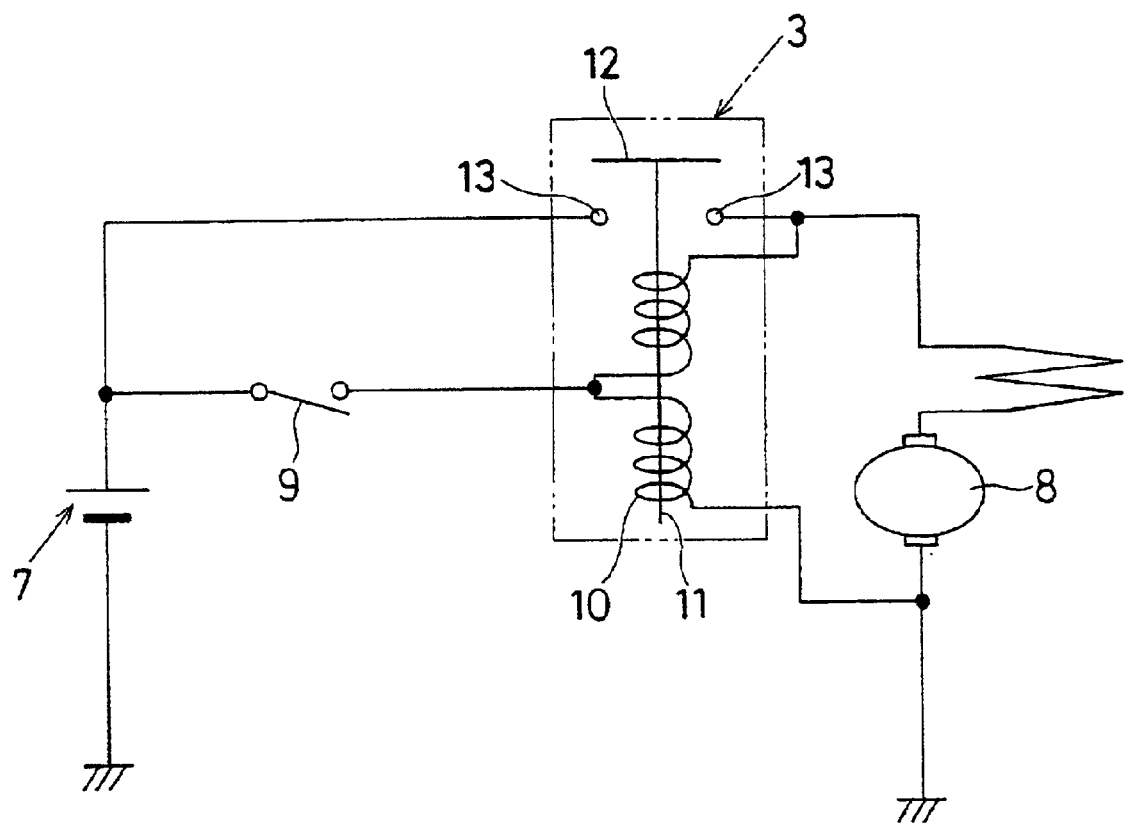
FIG. 3 is an electric wiring diagram showing electrical circuit of the starter shown in FIG. 1.

The motor 2 is a direct current type and constructed electrically as shown in FIG. 3. When the electromagnetic switch device 3 turns on a power supply circuit to the motor 2, the electric power is supplied from a battery 7 to an armature 8 to generate rotating force. The switch device 3 has an exciting coil and a plunger 11 slidably fit in the exciting coil 10. When the exciting coil 10 is energized by the battery 7 by turning on a key switch 9, the exciting coil 10 attracts the plunger 11. A movable contact 12 provided on the plunger 11 comes into contact with a pair of fixed contacts 13 thereby to turn on the motor circuit.

The reduction unit is a planetary gear type, and has a sun gear 14, an internal gear 15 and a plurality of (four) planetary gears 16. The sun gear 14 is formed on a motor rotation shaft (armature rotation shaft) 8a. The internal gear 15 is ring-shaped and disposed radially outside the sun gear 14. The planetary gears 16 are in meshing engagement with the sun gear 14 and the internal gear 15. When the armature 8 rotates, the sun gear 14 drives the planetary gears 16 to rotate about respective rotation axis which revolving around the sun gear 14. This revolving movement of the planetary gears 16 is transmitted as a rotating force for the output shaft 4.

The output shaft 4 is disposed coaxially with the armature shaft 8a through the reduction device, and supported rotatably in the housing 18 through a rear bearing 17 and a front bearing (not shown). The rear bearing 17 has a plurality of through holes 17a, which pass in the radial direction from the inner surface to the outer surface. The through holes 17a are arranged at equal intervals in the circumferential direction of the bearing 17.

The output shaft 4 is formed with a flange 4a at its rear end which faces the armature 8. The flange 4a has an enlarged diameter than other parts of the output shaft 4. A plurality of (four) carrier pins 19 are press-fit into the pin holes of the flange 4a. Each carrier pin 19 rotatably supports the planetary gear 16 thereon through a bearing 20.

The output shaft 4 is also formed with an accommodation recess 4b at its rear end in its radial center. The accommodation recess 4b is radially inside the flange 4a. The armature shaft 8a has a top end 8b having the reduced diameter in its radial center. This top end 8b is inserted into the accommodation recess 4b through a bearing 21. A conical recess 8c is formed on the end surface of the top end 8b in the radial center of the top end 8. A ball 22 is disposed between the bottom surface (axial end surface) of the accommodation recess 4b and the top surface of the top end 8b of the armature shaft 8a. The ball 22 thus received in the recess 8c thus receives thrust load of the armature shaft 8a while allowing relative rotation of the armature shaft 8a therein.

The one-way clutch 5 is a known roller type. The clutch 5 is helical-spline fit on the outer periphery of the output shaft 4, and coupled with the plunger 11 of the electromagnetic switch device 3 through a lever 23. Thus, the one-way clutch 5 is movable in the axial direction between the front bearing (not shown) and the rear bearing 17 in response to the movement of the plunger 11. The pinion gear 6 is coupled with the one-way clutch 5. The pinion gear 6 thus moves with the clutch 5 in the axial direction and meshes with the ring gear 24 of an internal combustion engine (not shown) to transmit the rotary force of the motor 2 to the ring gear 24.

The housing 18 has a flange 18a and a nose 18b. The flange 18a is for fixing the starter 1 to the engine when the starter 1 is assembled to the engine. The nose 18b is at the front side of the flange 18a and covers the pinion gear 6. The nose 18b however has an opening 1 from which the pinion gear 6 is exposed to engage with the ring gear 24.

Figure 2:
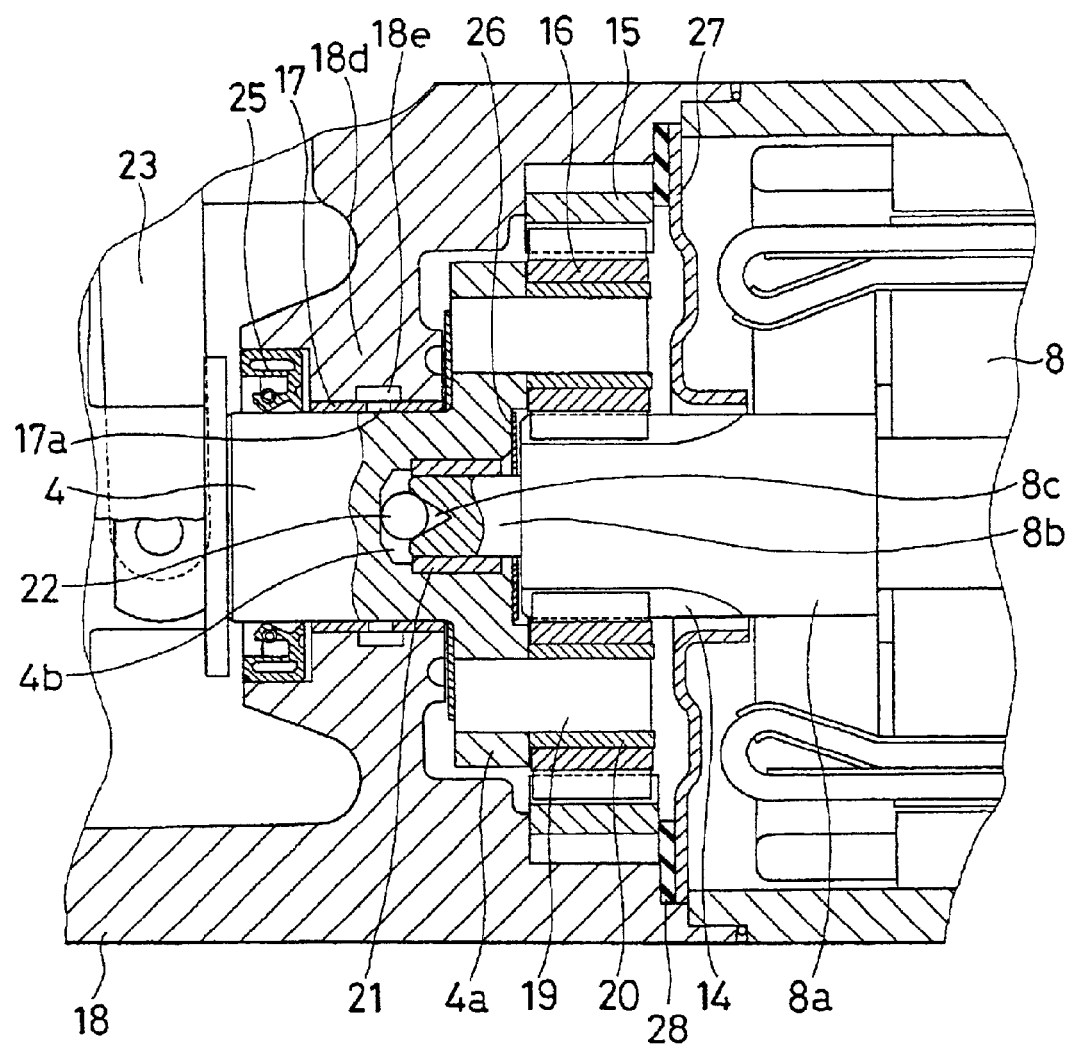
FIG. 2 is an enlarged sectional view showing a planetary gear reduction device of the starter shown in FIG. 1.

The housing 18 further has a holding part 18d for holding the rear bearing 17 as shown in FIG. 2. A groove 18e is formed annularly or in the ring shape in the inner peripheral surface of the holding part 18d. The through holes 17a are communicated with the groove 18e. A sealing member 25 is press-fit in the holding part 18d in sliding contact with the outer periphery of the output shaft 4 at the front side of the rear bearing 17, that is, at the side opposite the motor 2. This seal member 25 is and oil seal, for instance, and located a predetermined distance (about 0.5 to 3.0 mm) away from the rear bearing 17 in the axial direction.

The armature shaft 8a and the output shaft 4 are fit with the ball 22 therebetween as shown in FIG. 2, so that the rear surface of the flange 4a and the front surface of the armature shaft 8a face each other with a spacing therebetween in the axial direction at a part radially outside the top end 8b. A thrust receiving member 26 having a predetermined plate thickness is interposed between the opposing faces of the flange 4a and the armature shaft 8a. The thrust receiving member 26 may be a ring-shaped flat washer and has a thickness slightly smaller than the spacing between the opposing faces of the flange 4a and the armature shaft 8a.

The starter 1 as constructed above operates as follows.

When the ignition key switch 9 is turned on to energize the exciting coil 10 of the electromagnetic switch device 3, the plunger 11 is attracted by the magnetic force. Movement of the plunger 11 is transmitted to the one-way clutch 5 through the lever 23. The one-way clutch 5 is pushed forward together with the pinion gear 6 until the pinion gear 6 comes to contact the ring gear 24.

When the plunger 11 is attracted further and the movable contact 12 comes into contact with the fixed contacts 13, the motor current is supplied from the battery 7 to the armature 8. The armature 8 starts to rotate with this motor current. The rotation of armature 8 is transmitted to the output shaft 4 while being reduced in rotation speeds by the reduction device. The rotation of the output shaft 4 is transmitted to the pinion gear 6 through the one-way clutch 5. The pinion gear 6 rotates to mesh with the ring gear 24 and moves forward to rotate the ring gear 24, thus attaining engine starting.

After the engine starts rotating, the ignition key switch 9 is turned off to stop energization of the exciting coil 10. The plunger 11 is pushed back by a spring (not shown) to disengage the movable contact 12 from the fixed contacts 13, thereby stopping the supply of motor current and stopping the rotation of armature 8. With this movement of plunger 11, the one-way clutch 5 is pulled back toward the motor side by the lever 23 coupled with the plunger 11, the pinion gear 6 is disengaged from the ring gear 24 and returned to the original position with the one-way clutch 5.

In the above embodiment, the output shaft 4, particularly the bottom surface part of the accommodating recess 4b, which receives the ball 22, is not heat-treated, and hence the bottom surface tends to wear. This wear may cause relative movement of the output shaft 4 and the armature shaft 8a in the axial direction, reducing the spacing between the rear end surface of the flange 4a and the front end surface of the armature shaft 8a. However, the reduction in the spacing is limited to the thickness of the thrust receiving member 26 disposed in the spacing. Thus, the thrust receiving member 26 restricts the output shaft 4 from moving toward the motor 2 too much. As a result, the carrier pins 19 for the planetary gears 16 and the like constituting the planetary gear reduction device do not come in contact with the partition plate 27 disposed between the motor 2 and the planetary reduction unit.

Further, because the movement of the output shaft 4 toward the motor side is limited by the thrust receiving member 26, the wear of bottom surface of the accommodation recess 4b is also limited and the ball 22 is held in position stably. Thus, the radial centers of the shafts 4 and 8a can be aligned on line by the ball 22. As a result, even when wear occurs in the bearing 21 fit in the accommodation recess 4b to support the top end of the armature shaft 8b, unbalanced load applied to the planetary gear reduction unit can be minimized. As such, the rotation loss can be minimized and hence starter performance can be maintained.

The thrust receiving member 26 starts to receive thrust loads from both surfaces of the output shaft 4 and the armature shaft 8a only after the bottom surface of the accommodation recess 4b wears a certain depth. Therefore, rotation loss caused by sliding of the thrust receiving member 26 on both surfaces is minimized.

The present invention should not be limited to the disclosed embodiment, but may be implemented in many other ways without departing from the spirit of the invention.

What is claimed is:

1. A starter comprising:

a motor having a motor shaft;

an output shaft arranged coaxially with the motor shaft;

a planetary gear reduction device for transmitting rotation of the motor shaft to the output shaft in reduced rotation speeds; and a ball disposed at a first thrust receiving location between the motor shaft and the output shaft for receiving thrust load and allowing relative rotational movement between the motor shaft and the output shaft, wherein the motor shaft and the output shaft have respective end faces opposing each other, with a spacing therebetween in an axial direction, at a second thrust receiving location between the motor shaft and the output shaft, wherein a thrust receiving member is disposed in the spacing between the end faces of the motor shaft and the output shaft at the second thrust receiving location, the thrust receiving member being thinner than the spacing to be able to contact both end faces of the shafts and receive thrust only when one of the shafts wear more than a predetermined length, whereby initially only the ball receives thrust, and subsequently, after wearing of the one of the shafts to more than the predetermined length, both the ball and the thrust receiving member receive thrust, and the thrust receiving member also being disposed between the output shaft and the planetary gear reduction device, and wherein one of the shafts has a wear characteristic at a position where the ball contacts.

2. A starter as in claim 1, wherein an accommodation recess is formed in one of the shafts to rotatably receive the ball and an end of other one of the shafts therein.

3. A starter as in claim 1, wherein the thrust receiving member is a ring-shaped plate washer.

4. A starter as in claim 1, wherein a housing is provided to accommodate the planetary gear reduction unit and the output shaft therein and fixed to the motor in the axial direction, and wherein a partition wall is provided between the housing and the motor to separate the planetary reduction unit from the motor.

5. A starter as in claim 2, wherein the output shaft is formed with a flange of an enlarged diameter at a radial outside of the accommodation recess, and wherein the planetary gear reduction unit includes planetary gears rotatably supported on carrier pins fit into the flange.

6. A starter as in claim 2, wherein the accommodation recess is formed in an end of the output shaft in an axial direction.

7. A starter as in claim 2, wherein a bearing is fit in the accommodation recess to rotatably support the end of other one of the shafts therein.

8. A starter as in claim 2, wherein the accommodation recess is formed in a radial center of the one of the shafts.

9. A starter as in claim 2, wherein a conical recess is formed in a radial center of the end of other one of the shafts to partly receive the ball.

10. A starter as in claim 1, wherein the shaft having the wear characteristic is not heat-treated.

11. A starter as in claim 6, wherein the end of the output shaft is not heat-treated.

12. A starter as in claim 2, wherein the thrust receiving member is disposed between the accommodation recess and the reduction device.

13. A starter as in claim 2, wherein the accommodation recess is formed in the output shaft, the motor shaft is formed with a reduced-diameter top end received in the accommodation recess, and the thrust receiving member is disposed around the top end.

14. A starter as in claim 13, wherein the motor shaft is formed with a sun gear, and the thrust receiving member is disposed between the sun gear and the top end.

15. A starter comprising:
a motor having a motor shaft that has a top end of reduced diameter in a radial center;
an output shaft arranged coaxially with the motor shaft and having an accommodation recess in a radial center at a rear end thereof to receive the top end of the motor shaft therein;
a first thrust receiving member disposed in the accommodation recess at a first thrust receiving location between the motor shaft and the output shaft for receiving thrust load and allowing relative rotational movement between the motor shaft and the output shaft; and
a planetary gear reduction device for transmitting rotation of the motor shaft to the output shaft,
wherein the motor shaft and the output shaft have respective end faces opposing each other with a spacing therebetween in an axial direction at radial outsides of the accommodating recess of the output shaft and the top end of the motor shaft under a condition that the first thrust receiving member is received in the accommodation recess,
wherein a second thrust receiving member thinner than the spacing in the axial direction is provided adjacent to the planetary gear reduction device in an axial direction at a second thrust receiving location between the motor shaft and the output shaft, the second thrust receiving member able to receive thrust and restrict the output shaft from moving toward the motor more than a predetermined length only after the accommodation recess wears the predetermined length in the axial direction, whereby initially only the first thrust receiving member receives thrust, and subsequently, after wearing of the accommodation recess in the amount of the predetermined length, both the first and second thrust receiving members receive thrust.

16. A starter as in claim 15, wherein the output shaft is not heat-treated at a position where the first thrust receiving member contacts.

17. A starter as in claim 15, wherein the second thrust receiving member is provided adjacent to the rear end of the output shaft.

18. A starter as in claim 15, wherein the second thrust receiving member is a ring-shaped washer and fit around the top end of the motor shaft and adjacent to a sun gear of the motor shaft.

* * * * *